United States Patent [19]

Shaw

[11] Patent Number: 5,775,261
[45] Date of Patent: Jul. 7, 1998

[54] INSECT-KILLING CONTAINER WITH DYNAMIC ENTICEMENT

[76] Inventor: Sen-Yen Shaw, P. O. Box 55-846, Taipei, Taiwan

[21] Appl. No.: 811,040

[22] Filed: Mar. 4, 1997

[51] Int. Cl.[6] .................................................. A01K 1/00
[52] U.S. Cl. ........................................................ 119/482
[58] Field of Search ........................... 119/452, 453, 119/455, 482, 484, 496; 43/98, 112

[56]  References Cited

U.S. PATENT DOCUMENTS

| 2,095,323 | 10/1937 | Di Marino | 43/112 |
| 2,117,767 | 5/1938 | Lindsley | 43/112 |
| 3,346,988 | 10/1967 | Pickering | 43/112 |
| 5,241,779 | 9/1993 | Lee | 43/112 |
| 5,347,748 | 9/1994 | Moreland et al. | 43/112 |

*Primary Examiner*—Thomas Price

[57] ABSTRACT

An insect-killing container including: a housing for keeping a pet therein, and an electric-shock screen provided with high voltage and secured on a side wall of the housing corresponding to a ventilation window of the housing, whereby upon emitting of the pet's odor or upon visual observation of the pet in the housing, an insect such as a mosquito or a housefly will be attracted by the pet to enter the housing through the electric-shock screen to be killed by the high-voltage on the screen for efficiently eradicating insects.

4 Claims, 2 Drawing Sheets

INSECT-KILLING CONTAINER WITH DYNAMIC ENTICEMENT

BACKGROUND OF THE INVENTION

A conventional insect killing apparatus includes a lamp assembly powered to generate light for attracting the insects, and an electric grating surrounding the lamp assembly and applied with a high voltage to kill the insects when contacted. However, such a conventional insect killing apparatus is not an efficient device to kill the mosquitoes because only a lamp Light is not enough to attract and kill the mosquitoes. The female mosquitoes like to bite and suck blood from a warm-blooded animal; while the housefly has a habit of alighting upon the exposed parts of an animal body. Accordingly, if an animal is put into an insect trap, it will play as a "dynamic enticement" to attract the mosquito and housefly, which may then be killed and eradicated easily.

SUMMARY OF THE INVENTION

The object of the present invention is to provide an insect-killing container including a housing for keeping a pet therein, and an electric-shock screen provided with high voltage and secured on a side wall of the housing corresponding to a ventilation window of the housing, whereby upon emitting of the pet's odor or upon visual observation of the pet in the housing, an insect such as a mosquito or a housefly will be attracted by the pet to enter the housing through the electric-shock screen to be killed by the high-voltage on the screen for efficiently eradicating insects.

DETAILED DESCRIPTION

Figure 1:
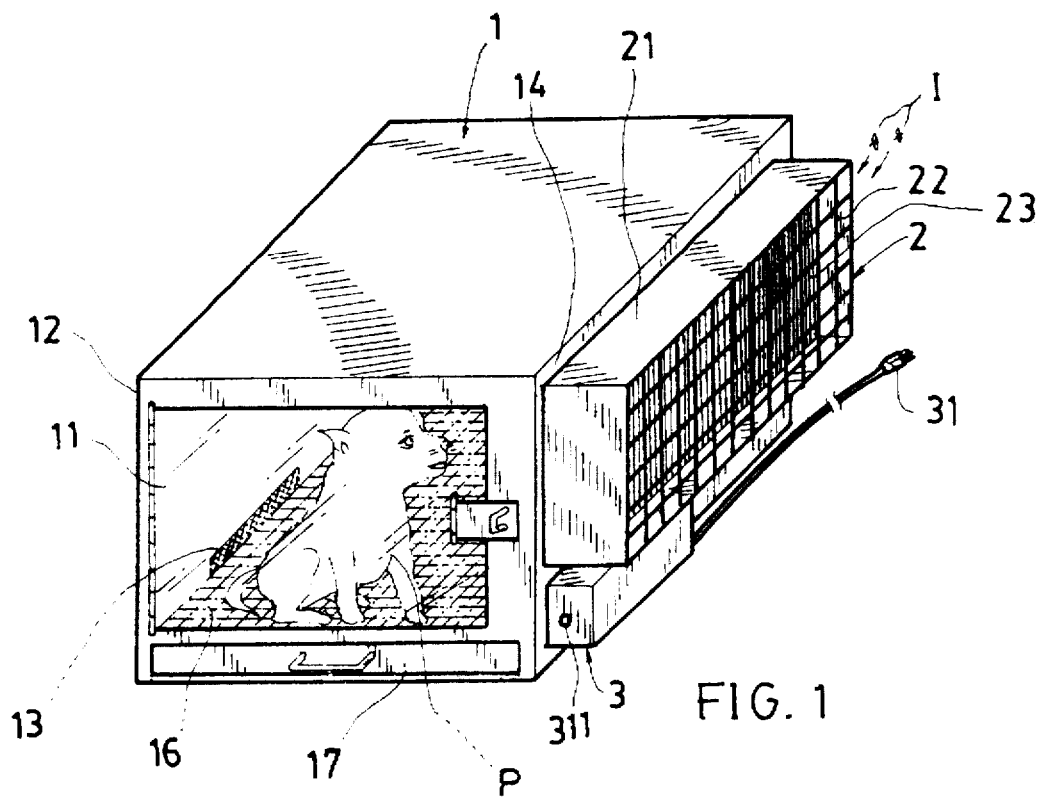
FIG. 1 is a perspective view of the present invention.

An insect-killing container of the present invention is shown in FIGS. 1–4, which comprises a housing 1, an electric-shock screen 2, and a power supply system 3. Although the housing 1 and the screen 2 are formed as parallelepiped as shown in the drawings, their shapes, relative positions and number are not limited in the present invention.

The housing 1 includes a door 11 pivotally secured to the housing 1, a first side wall 12 having a lower ventilation window 13 formed at a lower position of the first side wall 12 having a net disposed on the lower ventilation window 13 for entering air A inwardly into the housing 1 but for precluding entrance of insects through the lower ventilation window 13, at second side wall 14 opposite to the first side wall 12 having an upper ventilation window 15 formed at an upper position of the second side wall 14 for natural drafting of air A from interior of the housing 1 for discharging air outwardly A' for spreading odor of a pet, animal or enticement P kept in the housing 1 for attracting insects I such as mosquitoes and houseflies to enter the housing 1, a perforated platform 16 provided on a lower portion of the housing 1 for supporting the pet or animal P thereon, and a drawer 17 slidably held in a bottom of the housing 1 under the platform 16 for collecting and removing any manure as discharged from the pet P or any dirts or decay foods.

The upper ventilation window 15 may be covered with a net; or formed as a protective grating, or louvre; or just drilled with perforations for ventilation and for observation uses. The holes, perforations or openings in the upper ventilation window 15 should not be large enough for allowing an outward protruding of the animal body portion, such as its tail, leg, ear or mouth for safely protecting the pet against any injury or shock by the screen 2.

The lower ventilation window 13 may also be formed as a plurality of perforations allowing the entering of fresh air, but precluding entrance of insects therethrough.

Figure 2:
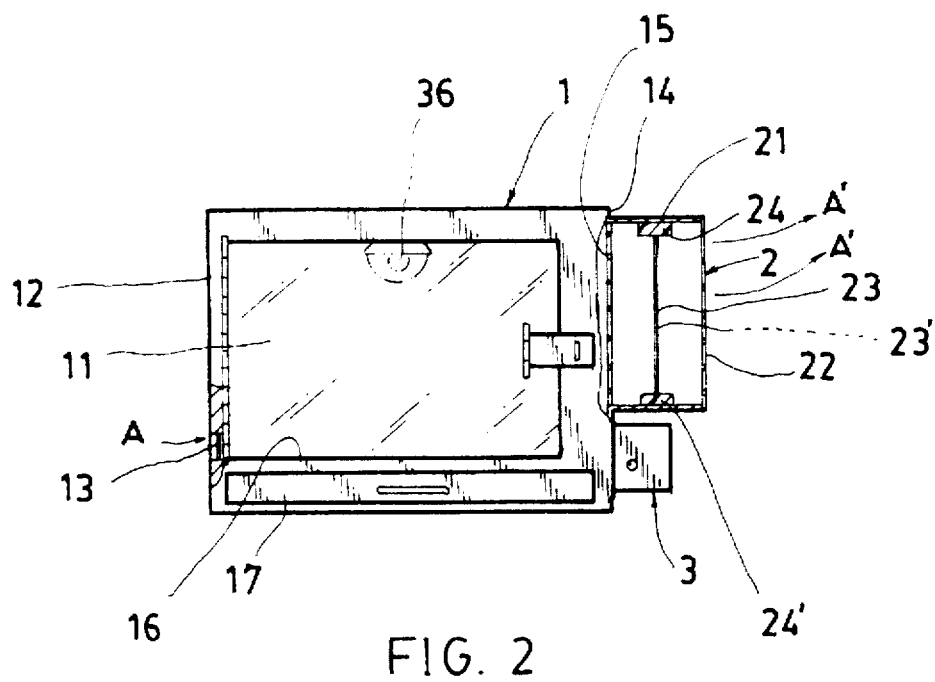
FIG. 2 is a front view of the present invention.

The upper ventilation window 15 should be positioned higher than the lower ventilation window 13 for natural drafting of air ventilation A, A' as shown in FIG. 2. The area of the lower ventilation window 13 is made as smaller as possible to eliminate odor spreading through the lower ventilation window 13, thereby allowing an odor emission of the pet P for attracting insects I through the upper ventilation window 15 where a "fatal" electric-shock screen 2 is mounted thereon for killing tie insects I entering the housing 1 through the screen 2.

The electric-shock screen 2 includes: a hood 21 made of electrically insulative materials and secured on the second side wall 14 for fencing the upper ventilation window 15, at least a protective grating 22 disposed on an outer portion of the hood 21 for precluding any intrusion of human or animal body outside the housing into the screen 2, a plurality of positive electrode bars 23 and a plurality of negative electrode bars 23' juxtapositionally mounted by a pair of electrically insulative frames 24, 24' in a middle portion of the hood 21 between the protective grating 22 and an upper ventilation window 15 of the housing 1 with each positive electrode bar 23 interposed between every two adjacent negative electrode bars 23'; with every two neighboring electrode bars 23, 23' defining an aperture 26 having a width generally equal to or slightly larger than a size or length of a housefly or mosquito for entering the insect therethrough; with the positive electrode bars 23 electrically connected in series by a positive wire 25 to a positive pole 35 of a power supply system 3; and with the negative electrode bars 23' electrically connected in series by a negative wire 25' with the negative pole 35' of the power supply system 3.

Each aperture 26 between the two electrode bars; 23, 23' may allow the intrusion of the insect I and may also provide a clear vision of the pet P as kept in the housing 1 by the insect for attracting the insect to enter the housing 1 through the aperture 26 of the screen 2 where the high tension or voltage between the positive electrode bar 23 and the negative electrode bar 23' will cause an electric shock to kill the insect.

The power supply system 3 includes: a power source 31 which may be a municipal power of alterating current having a power indicator lamp 311 which is lit up for indicating a normal power supply to the screen 2, a transformer 32 for converting a lower voltage of the power source 31 to a high voltage sufficient to electrically kill the mosquitoes and houseflies, a rectifier 33 for rectifying the alternating current to be a direct current for charging a capacitor 34 connected across a positive pole 35 and a negative pole 35' of a direct-current power source output from the power supply system 3 for respectively connecting the positive wire 25 and the negative wire 25' of the electric-shock screen 2, a lamp 36 electrically connected to the power source 31 through a lamp switch 361 for lighting the pet P as kept in the housing 1 and also for warming the pet by the heat as emitted from the lamp 36, and a fan 37 (not shown) electrically connected to the power source 31 through a fan switch 371 for forcibly drafting air into the housing for a well ventilation in the housing 1.

However, the fan 37 is not critical in this invention, and may be neglected if a natural drafting is enough for keeping a well ventilation in the housing according to the present invention.

The housing 1, besides the upper and lower ventilation windows 15, 13, is a closed container without openings, thereby allowing the mosquitoes or flies to enter the unique opening, namely the screen 2 to be killed therein.

Similarly, there is no opening, except the apertures 26 among the electrode bars 23, 23', provided in the screen 2 so that the mosquitoes or flies, once passing through the apertures 26 in the screen 2 to enter the housing 1, will be killed by the high voltage applied across the two electrode bars 23, 23'.

When a pet or a warm-blooded animal P is kept in the housing 1, the animal odor will be spread outwardly by tie air A, A' naturally drafted in the ventilation windows 13, 15 to attract the mosquitoes I. The heat from the warm body of the pet P in commensuration of the lamp heat from the lamp 36 will cause thermosiphon of the air entering the housing 1 through the lower window 13 to allow the hot or warm air to flow outwardly A' through the upper window 15 to spread the odor of the pet P as laden in the air outwardly to attract the insect. Any manure or decay food as drained or discharged into the drawer 17 will also transmit its odor outwardly through the upper window 15 to attract the houseflies to enter the housing 1 through the screen 2 where the flies will be killed by the high tension generated by the screen 2. Meanwhile, the pet P in the housing will be clearly observed by the insects through the apertures 26 to attract the intrusion of the insect.

Figure 3:
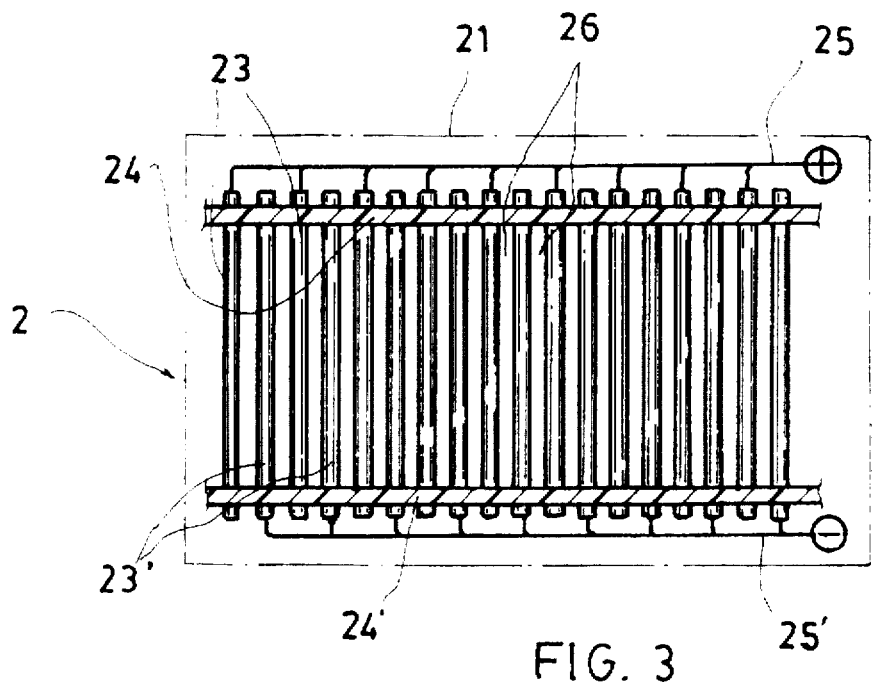
FIG. 3 shows the electric-shock screen of the present invention.
Figure 4:
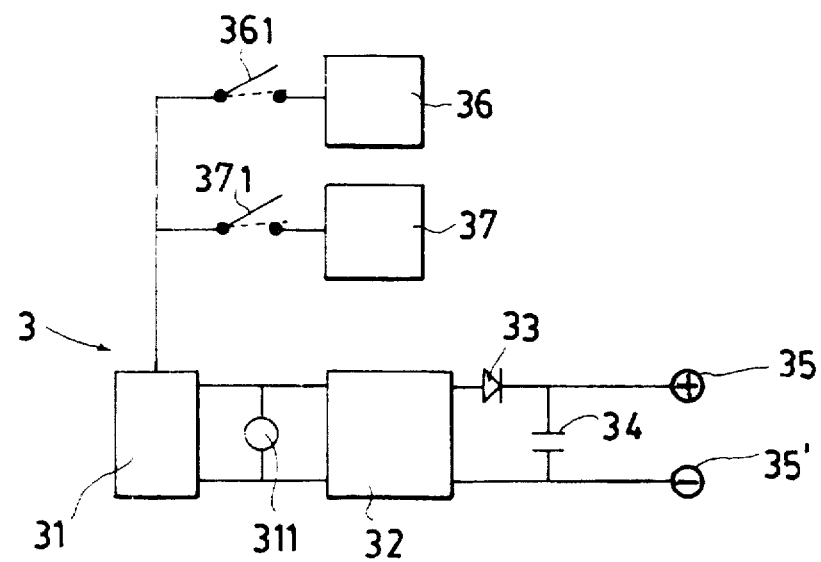
FIG. 4 shows an electric diagram of the present invention.

As shown in FIGS. 4, 3, the municipal power source 31 is transformed and rectified to accumulate the high-voltage electric energy in the capacitor 34. Upon passing of any mosquito or fly through the positive electrode bar 23 and the negative electrode bar 23', the high-voltage electric energy disposed on two poles of the capacitor 34 will be discharged through the mosquito or fly body to instantly kill the insect which will also be eject away by the electric spark.

The power supply system 3 and the electric-shock screen 2 of the present invention may be provided with a circuit breaker for safely protecting the pets P or the people.

The pet may also be substituted with a simulative or "false" pet when the user having no interest in raising a pet in the housing 1. Other enticements may also be put into the housing for attracting the insects to be killed by the high-tension screen 2.

If the housing 1 is made as a compact small unit, the lower ventilation window 13 may then be omitted in the housing 1.

The present invention provides a container for accommodating a pet P therein with the pet playing as a "dynamic or live enticement" for tempting the insect to enter the housing through the unique "port", namely, the high-voltage screen 2 to efficiently kill the insect to be superior to the conventional lamp-type insect killing apparatus.

The present invention may be modified without departing from the spirit and scope of this invention.

I claim:

1. An insect-killing container comprising:

a housing having a lower ventilation window formed at a lower portion of a first side wall of the housing and having an upper ventilation window formed at an upper portion of a second side wall of the housing opposite to the first side wall, said upper ventilation window positioned above said lower ventilation window for drafting air from said lower ventilation window to said upper ventilation window, and said housing having an enticement kept therein to attract insects to enter the housing through said upper ventilation window, said housing including a perforated platform formed in a lower portion of said housing for supporting a pet or animal kept in said housing, and a drawer slidably held in a bottom portion of said housing under said platform for collecting and removing manure or decay food as drained from said platform; and an electric-shock screen mounted on said upper ventilation window on said second side wall of said housing for screening said upper ventilation window, said screen electrically powered with a high voltage thereon for killing insects passing through said screen when entering said housing through said upper ventilation window and said screen as attracted by said enticement in said housing, said electric-shock screen including:

a hood secured on said housing for fencing said upper ventilation window, a protective grating secured on an outer portion of said hood for precluding intrusion of a person into said screen, a plurality of positive electrode bars and a plurality of negative electrode bars juxtapositionally mounted on at least an electrically insulative frame in a middle portion in said hood to be electrically connected to a positive pole and a negative pole of a direct-current power source of high voltage, with each said positive electrode bar interposed between two neighboring negative electrode bars, and said positive and negative electrode bars positioned between the upper ventilation window of the housing and the protective grating of the screen, whereby upon passing of an insect through an aperture between each positive electrode bar and each negative electrode bar having high voltage applied therebetween, the insect will be discharged and killed by the high voltage between the electrode bars before entering said housing.

2. An insect-killing container according to claim 1, wherein said positive electrode bars are connected in series to a positive pole of the direct-current power source by a positive wire; and said negative electrode bars are connected in series to a negative pole of the direct-current power source by a negative wire; said positive and negative poles of the direct-current power source disposed on two poles of a capacitor which is charged by a direct current rectified and transformed by an alternating-current power source.

3. An insect-killing container according to claim 2, wherein said alternating-current power source is electrically connected to a lamp mounted in said housing having a pet raised therein.

4. An insect-killing container according to claim 1, wherein every two neighboring electrode bars define an aperture therebetween to allow entrance of an insect therethrough and to allow an observation of the enticement kept in said housing through said aperture.

* * * * *